United States Patent [19]

Miyata

[11] 4,260,228

[45] Apr. 7, 1981

[54] COLLAGEN GEL CONTACT LENS AND METHOD OF PREPARATION

[75] Inventor: Teruo Miyata, Tokyo, Japan

[73] Assignee: Opticol Corporation, Stamford, Conn.

[21] Appl. No.: 113,856

[22] Filed: Jan. 21, 1980

[51] Int. Cl.³ ........................ C08L 89/06; C09H 1/04; G02C 7/04

[52] U.S. Cl. ............................... 351/160 H; 260/117; 260/123.7; 435/273

[58] Field of Search ....................... 351/160 H, 160 R; 435/273; 260/117, 123.7

[56] References Cited

U.S. PATENT DOCUMENTS

| | | | |
|---|---|---|---|
| 3,314,861 | 4/1967 | Fujii | 260/117 |
| 3,443,261 | 5/1969 | Battista | 351/160 H |
| 3,530,037 | 9/1970 | Nishihara | 351/160 H |
| 3,760,045 | 9/1973 | Thiala et al. | 351/160 H |
| 3,955,012 | 5/1976 | Okamura et al. | 351/160 H |

FOREIGN PATENT DOCUMENTS

| | | | |
|---|---|---|---|
| 49-39174 | 10/1974 | Japan | 351/160 H |

*Primary Examiner*—John K. Cobin
*Assistant Examiner*—Scott J. Sugarman
*Attorney, Agent, or Firm*—Edward J. Mahler

[57] ABSTRACT

An improved collagen gel soft contact lens is prepared from an aldehyde-crosslinked, lens-shaped collagen gel containing a water-soluble, aliphatic, monomeric, polyhydroxy compound, e.g., glucose.

13 Claims, No Drawings

COLLAGEN GEL CONTACT LENS AND METHOD OF PREPARATION

This invention relates to a novel method for the production of a stable, high-clarity collagen gel soft contact lens in which the collagen gel contains a water-soluble, aliphatic, monomeric, polyhydroxy compound, is shaped and crosslinked with an aldehyde at relatively high pH, e.g., 5.0 to 8.0. The lens is particularly suitable for extended wear.

Collagen constitutes about 20 to 30 percent of the total body protein in vertebrates. It is a fibrous protein and functions primarily as a supporting tissue and scaffolding for other proteins and cells. It is present throughout the body but exists in high concentrations in skin, tendon and bone.

Collagen is recovered from these tissues by a variety of techniques the oldest known method being the boiling of the tissue in water which denatures some of the collagen and forms the well-known gelatin on cooling. For use as a biomaterial however, collagen must be recovered in native, undenatured form, i.e., with little or no destruction of the basic rigid triple helical structure; (tropocollagen).

Undenatured native collagen is recovered principally by two methods, (a) solution by dissolving the collagen in acids, bases, salts or by enzyme digestion in which instances the collagen becomes actually dissolved, and (b) extraction in solid, undissolved, fiber form usually by the action of aqueous salt on minced, comminuted collagen raw material to produce a dispersion from which the solid is recovered by centrifuge, etc. Both the solution method and fiber extraction method are well described in the collagen art.

The chemistry, molecular structure and biochemical properties of collagen have been well-established. An up-to-date review article by the current inventors (Annual Review of Biophysics and Bioengineering Vol. 3, p. 231–253, 1974) contains an excellent compilation of references on the subject.

Contact lenses have been known as a commercial product for over 25 years. Contact lenses to date have been made from chemically synthesized materials which do not occur in nature. For example, most early contact lenses were made from polymethylmethacrylate or chemical modifications thereof, from hydroxyethylmethacrylate, from cellulose acetate butyrate, from silicones, etc. The collagen lens is the first lens made from naturally occurring animal material and especially from materials having physiological and immunological properties possessed by constituents of the eye itself, e.g., the cornea. The state of the art on commerical contact lenses and on extended wear of soft lenses is reviewed respectively in articles "A Contact Lens Update"—Contact Lens Forum, p 16–23 (May 1976); and "The Extended Wear of Soft Contact Lenses"—Perry S. Binder, J.C.E. Ophthalmology, Vol. 41, No. 6, pps 15–32 June 1979.

In copending application Ser. No. 26,945, filed Apr. 4, 1979 which is a continuation of Ser. No. 753,556 filed Dec. 22, 1976, there is described and claimed a collagen gel contact lens in which the collagen is made from reconstituted, solubilized, defatted collagen gels, particularly enzyme-solubilized gels.

In copending application Ser. No. 29,091, filed Apr. 11, 1979 there is described and claimed a soft contact collagen lens made from gels of fiber collagen, and from gels comprising a mixture of solubilized collagen and fiber collagen.

The invention of instant application is applicable to both types of collagen gels, viz. solubilized or fiber or mixtures thereof.

It has now been discovered that lenses of acceptable physical strength and biological stability (i.e. resistance to bacterial attack) may be prepared by an improved process by adding to the collagen gel at least one water-soluble, aliphatic, monomeric, polyhydroxy compound, and subsequently shaping and crosslinking the gel by aldehyde treatment. The monomer is added to the collagen gel in amounts ranging from about 0.3 to 5.0 mol/l in the collagen gel. Preferred additives are glucose, sucrose, fructose, lactose, galactose and glycerol, all of which are available commercially in relatively pure state. The preferred concentration of the additive varies with the particular additive, but generally falls within 0.5 to 3.0 mol/l in the collagen gel, but in case of glycerol, within 1.0 to 5.0 mol/l. The method is further improved by adding to the gel about 0.01–0.2 M sodium citrate, sodium acetate or other salt of organic acid.

It is well known that native collagen is relatively free from attack by most enzymes except under certain conditions. An exception is the enzyme collagenase which is capable of reducing collagen to polypeptides. It is important therefore to render the collagen gel as resistant as possible to decomposition. Crosslinking of the gel goes a long way toward the physical strengthening of the molecular structure and at the same time stabilizes the lens against proteolytic enzyme attack.

Bacteria produce a variety of enzymes that could digest collagenous materials. The most active of these is pseudomonas aeruginosa. It has been known that a human cornea infected with this bacteria can be destroyed in a matter of hours, absent prompt discovery and expert treatment. The effects of incubating collagen lenses in a dense suspension of pseudomonas aeruginosa strain is used, therefore, to estimate the stability of the lens to proteolytic attack. In these tests concentrations of bacteria are used far in excess of that which the lens could ever possibly encounter in normal human experience. Practically all collagen lens, properly prepared and crosslinked, even when exposed to the dense concentrations of the strain have exhibited far greater resistance than that reported for human cornea resistance.

Applicant has found that the conditions of crosslinking are highly important in producing collagen gel lenses having optimum physical mechanical and biological properties. It has been found that under too severe conditions during the crosslinking process, e.g. excessive amounts of irradiation or too lengthly irradiation, certain "breaks" in the collagen triple helix structure occur and these possibly become nucleating sites for the growth of enzyme-producing bacteria which subsequently attack the collagen molecule and cause liquefaction of the gel.

Control of the collagen crosslinking procedure is critical in order to assure a lens having the desired mechanical strength, clarity and biostability. It has been found that crosslinking by means of the irradiation method, e.g. $Co^{60}$, ultraviolet light, etc., requires a fine degree of care and at times becomes too sensitive for assurance of desired reproducibility.

Although the chemical method of crosslinking is susceptible to closer control of crosslinking conditions, it too has certain shortcomings e.g. extremely long reaction time, which led to the present discovery. If one attempts to crosslink collagen gel at its usual pH of 3.0 to 4.0 by treatment with an aldehyde, the reaction is extremely slow requiring a period of about 10 days to two weeks for satisfactory results. Now however, the reaction can be accelerated by raising the pH by addition of NaOH to 5.0 to 8.0; but under these conditions the gel becomes cloudy due to precipitation of collagen fiber and is not suitable for use in a high-clarity contact lens.

It has been discovered that the crosslinking reaction can be carried out by aldehyde treatment at the higher pH and at the same time avoid the cloudiness and produce a high clarity lens by adding to the acidified collagen gel about 1 M of at least one of the aforementioned polyhydroxy compounds, e.g., glucose, adjusting to pH to 5.0 to 8.0, and then subjecting the gel to aldehyde crosslinking. Under these conditions, satisfactory crosslinking was accomplished at room temperature in about 16 hours. Such duration is commensurate with practical operation in which the gel undergoing crosslinking is placed in the lens mold, left overnight and recovered the following morning.

The crosslinking is carried out by treatment of the collagen gel with such aldehydic agents as formaldehyde, glutaraldehyde, acrolein, glyoxal, dialdehyde-starch, etc. Applicant prefers the use of acrolein and gluteraldehyde due to their controllable reaction under proper conditions, and their ability to be more easily removed, e.g., by leaching from the crosslinked gel. Crosslinking is carried out on the lens-shaped gel and preferably in the lens mold simultaneously with the molding of the lens.

Gels suitable for use in the preparation of collagen lenses of this invention may be prepared from solubilized collagen, from fiber collagen and from mixtures thereof. The preferred gel is one made from enzyme-solubilized collagen which has been treated for removal of fats and lipid bodies and which is poor in telopeptides and relatively free of other contaminating proteins, saccharides, etc. When mixtures of solubilized collagen and fiber collagen are used to prepare the gel, the ratio of solubilized collagen to fiber collagen is not critical and may range from 10 to 1 to 1 to 10; however, mixtures in the range of 50—50 are preferred.

Gels having collagen concentrations ranging from 1% to 30 wt. % can be utilized for collagen lens production, but the preferable concentration is 5% to 20% with the balance after addition of the other additives, being water.

The method of obtaining the collagen from the crude collagen source, e.g. skin, tendon, hide, etc., is not critical, and some flexibility may be used in the selection of the particular tissue and the method applied thereto. The collagen may be solubilized by any of the standard extraction methods e.g. acid, base or salt extraction or enzyme digestion; or recovered in fiber form by dispersion in an aqueous medium and separation by some means such as centrifuging. Since applicant prefers to use gels prepared from enzyme-digested collagen, the preparation of the collagen gel used as the starting material in this invention will be exemplified from the following description of that preferred process:

Cleaned, de-haired hide or skin is cut into pieces of workable size and slurried in water in the presence of a proteolytic enzyme (other than collagenase). Suitable enzymes are pepsin, trypsin, pronase, proctase, etc. The soluble extract is worked up as follows: The solution is brought to a pH of about 10.0 (when extracting for example with pepsin or proctase) to denature the remaining active enzyme, and then neutralized to a pH of about 6.7–7.0. "Atelocollagen" precipitates at this pH leaving behind in solution (to be discarded) the digested telopeptides, and other contaminating proteins, e.g. albumin, globulin, and any saccharides, mucopolysaccharides, etc. The atelocollagen is usually further purified by repeated solubilization at pH 2–3, reprecipitation at pH 6–7 and recovered by filtration. The recovered collagen is then washed with ethanol to remove any lipid content and excess water in preparation for the solvent defatting process. The collagen is defatted by treatment with 1:1 ethanol-ethyl ether mixture and recovered as a fibrous solid. It is then air-dried, and subsequently converted to gel by solubilization in acidified water at pH of about 3.0.

The collagen gel is worked up to a clear soft contact lens as follows: To a 5 wt. % aqueous collagen gel is added 0.2 mol/l of citric acid and 1.0 mol/l of glucose. The mixture is homogenized over a period of approx. 30 min. to obtain a clear gel. The pH is adjusted to 5.0–7.0 by the addition of aq. NaOH soln. The gel is centrifuged to deaerate it and acrolein is added to extent of 2.0 wt.% dry basis in an ice bath. The gel was poured into a lens mold and kept overnight at room temperature. After approx. 16 hrs. the lens was removed from the mold. The lens was clear and of excellent physical and mechanical strength. It survived exposure to P. aeruginosa for a period of 8 days, before appearances of liquefaction set in.

Although the invention has been described as applicable to unmodified collagen, it may also be applied to chemically modified collagens in which the amino and/or carboxyl groups thereof have been subjected to esterification or acylation respectively, or both. Suitable lens are thus prepared for example from methylated and/or succinylated collagens.

The amount of polyhydroxy monomer added to the collagen gel varies approx. from 0.5 to about 5.0 mol/l and generally amounts of 1.0 mol/l are preferred. In case of glycerol, an amount of 3.0 mol/l is preferred. In conducting the crosslinking, aldehyde in the amount of 0.002 to 0.075 parts per part of collagen on a dry weight basis have been used. Generally, amounts of 0.2–5.0 wt.% of dry collagen are preferred. Preferred crosslinking times are in the range of 8 to 20 hours at room temperature, and generally about 12–16 hours suffice.

The invention is illustrated by the following examples:

EXAMPLE 1

Enzyme-solubilized collagen gel was prepared as follows: Fresh calfskin (about 5 kg) was dehaired, cleaned by shaving and cut into small pieces. The skin was solubilized in twenty (20) liters of water (pH 3.0,HCl) by addition of 1 g of pepsin (approximate ratio of enzyme to collagen is 1/400) and kept at 20° C. for five days with intermittent stirring. The resulting viscous solubilized collagen was filtered through cheesecloth, then the filtrate is diluted to 0.5–1.0% collagen concentration and filtered through millipore filter of 0.65μ pore size, its pH adjusted to 10 with NaOH and allowed to stand for 24 hours at 4° C. to inactivate the pepsin. The pH of collagen was then adjusted to 7 to 8 (HCl) and collagen precipitate was collected by centrifuging. Fatty constituents were then removed from the collagen. To one part of collected collagen was added two parts of fat solvent, e.g. ethanol ether mixture (1:1), and the mixture was homogenized in a Waring blender. Collagen was separated from solvent by squeezing in cheesecloth and homogenized again with the same volume of solvent. After being squeezed it was air-dried to remove solvent and redissolved in 0.1 M citric acid solution containing 1 M glucose to make gel of 8% collagen. The pH of the gel was adjusted to 6.3 with NaOH solution. To about 10 g of the gel there is added 0.04 ml. of ice-cooled 10% glutaraldehyde, the pH adjusted to 6.3 and the mixture homogenized well in an ice bath, followed by removal of air via centrifuge. On a lower concave part of a lens mold was placed about 0.2 g. of the centrifuged gel and the mold was closed. The entire mold was allowed to stand at room temperature (25° C.) for 16 hours to crosslink the gel. The lens was removed from the mold and washed in pH 7.0 sodium phosphate buffer solution to leach out any excess glutaraldehyde, then placed in saline solution for preservation.

EXAMPLE 2

The above experiment was repeated utilizing acrolein for crosslinking instead of glutaraldehyde. To 10 g of gel (pH 7.0) there is added 0.24 ml of ice cooled 10% acrolein of pH 7.0 (3% acrolein of dry collagen). The same excellent results were obtained.

When adjusting the pH of the gel during aldehyde crosslinking care must be taken not to raise the pH much above 8.0, as this may cause collagen fiber formation and resulting cloudiness even when the polyhydroxy monomer additive is present. A pH of about 5.0 is required to initiate the desired reaction acceleration and a pH in the range of 5.0 to 8.0 is preferred.

The lens molds used in the shaping of the collagen gel were manufactured from brass, glass and plastic. The mold consists of a lower concave part and an upper convex part. The surface of the convex part, when the mold is closed, reaches the surface of the concave section, except for the desired thickness of the collagen lens. The desired thickness is approximately 0.1 to 0.5 millimeter, preferably about 0.3 millimeter.

Lenses prepared according to this invention were optically clear, flexible and stable and display excellent properties as a soft contact lens. They showed little deterioration when exposed for long periods of time to high concentrations of bacteria that produce enzymes.

Collagen gel lenses are kept in sterile water or saline solution and display excellent storage properties. They have approximately the same refractive index as water itself. Should a lens become dehydrated, partly or completely, due to exposure to dry air, or freeze-drying, it is restored unimpaired to its original conditions by simple immersion in water, thus displaying its "perfect memory" characteristic. A lens purposely allowed to become dry and shriveled returned to normal in less than twenty minutes after water immersion.

All of the collagen lenses of this invention can be modified by known optical techniques to prescription values. Thus, soft contact collagen lenses can be prepared for use by patients requiring known normal sight corrective measures, e.g., incorporation of spherical power.

Soft contact lens made from collagen gels of this invention possess all the characteristics and display all the advantages previously described by applicant and his colleagues in previous appplications on collagen soft contact lenses, both as to physical and optical properties and comfort to wearer.

Having described the invention in sufficient detail that it may be practiced by those skilled in the art

What is claimed is:

1. As an article of manufacture a soft contact lens consisting of a lens-shaped, subsequently aldehyde-crosslinked gel of solubilized collagen, said gel comprising (a) 1.0 to 30 wt.% collagen, (b) 0.3 to 5.0 mol/l of a water-soluble, aliphatic, monomeric, polyhydroxy compound, and (c) the balance water.

2. A soft contact lens of claim 1 in which the solubilized collagen is enzyme-digested collagen.

3. A soft contact lens of claim 2 in which the water-soluble polyhydroxy compound is glucose.

4. A soft contact lens of claim 2 in which the water-soluble polyhydroxy compound is glycerol.

5. A soft contact lens of claim 2 in which the collagen gel is crosslinked by treatment with acrolein at a pH of about 5.0 to 8.0.

6. A soft contact lens of claim 2 in which the collagen gel is crosslinked by treatment with glutaraldehyde at a pH of about 5.0 to 8.0.

7. An improved method for the manufacture of a collagen gel soft contact lens comprising the steps of:

(a) adding to a collagen gel containing 1.0 to 30.0 wt.% collagen a water-soluble, aliphatic, monomeric, polyhydroxy compound, (b) adjusting the pH of the gel to about 5.0 to 8.0

(c) adding to the gel an aldehyde crosslinking agent, (d) placing the gel containing the polyhydroxy compound and aldehyde in a lens mold, and (e) maintaining the gel mixture in the closed mold for a sufficient period of time to effect crosslinking of the collagen.

8. The method of claim 7 in which the collagen gel consists of solubilized collagen.

9. The method of claim 7 in which the collagen gel consists of enzyme-solubilized collagen.

10. The method of claim 7 in which the polyhydroxy compound is glucose.

11. The method of claim 7 in which the aldehyde is acrolein.

12. The method of claim 7 in which the aldehyde is glutaraldehyde.

13. The method of claim 7 in which citric acid is also added to the collagen gel prior to crosslinking.

* * * * *